(12) United States Patent
Nelson (10) Patent No.: US 6,907,021 B1
(45) Date of Patent: Jun. 14, 2005

(54) VIBRATION-DRIVEN WIRELESS NETWORK

(75) Inventor: Christopher John Nelson, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,477

(22) Filed: Apr. 14, 2000

(51) Int. Cl.[7] ................................................ H04Q 7/20
(52) U.S. Cl. ...................... 370/338; 455/41.3; 455/66.1
(58) Field of Search .......................... 370/338; 455/11.1, 455/41.3, 66.1

(56) References Cited

U.S. PATENT DOCUMENTS

| | | | |
|---|---|---|---|
| 5,345,226 A | 9/1994 | Rice, Jr. et al. | ........ 340/825.19 |
| 5,583,933 A | * 12/1996 | Mark | ..................... 379/357.04 |
| 5,838,905 A | 11/1998 | Leigh | ..................... 395/200.31 |
| 5,844,824 A | 12/1998 | Newman et al. | ....... 364/708.01 |
| 5,884,256 A | 3/1999 | Bennett et al. | ............. 704/235 |
| 5,887,259 A | 3/1999 | Zicker et al. | ................ 455/434 |
| 5,933,775 A | 8/1999 | Peters | ......................... 455/420 |
| 5,987,011 A | * 11/1999 | Toh | ............................. 370/331 |
| 6,607,136 B1 | * 8/2003 | Atsmon et al. | ............. 235/492 |

FOREIGN PATENT DOCUMENTS

WO   WO 200029920 A2 * 5/2000 ........... G06F/00/00

OTHER PUBLICATIONS

V. Gerasimov et al., 'Things That Talk', Master's Thesis, MIT program in Media Arts and Science, retrieved at http://vadim.www.media.mit.edu/ttt_paper/ttt.html, dated 1996.*

W. Bender et al., 'Techniques for data hiding', IBM Systems Journal, vol. 35, No. 3 & 4, 1996, pp. 313–336.*

V. Gerasimov et al., 'Things that talk: Using sound for device–to–device and device–to–human communication', IBM Systems Journal, vol. 39, No. 3 & 4, 2000, pp. 530–546.*

C. Lopes et al., 'Aerial Acoustic Communications', IEEE Workshop on Applications of Signal Processing to Audio and Acoustics, 2001, pp. 219–222.*

C. Lopes et al., 'Acoustic Modems for Ubiquitous Computing', Pervasive Computing, 2003, pp. 62–71.*

N. Domingues et al., 'Aerial Communications using Piano, Clarinet, and Bells', IEEE, 2002, pp. 460–463.*

"Method and Apparatus of Integrating a Personal Computer, Televisions, and Telephones into a Low–Cost Home Network," IBM Technical Disclosure Bulletin, vol. 40 , No. 12 Dec. 1997, pp. 23–24.

* cited by examiner

*Primary Examiner*—Melvin Marcelo
(74) *Attorney, Agent, or Firm*—Marilyn Smith Dawkins; Dillon & Yudell LLP (57) ABSTRACT

A system and method for delivering messages among multiple localized devices. A communication interface includes a base media interface within each of the networked devices for processing incoming and outgoing vibration wave messages in accordance with a network protocol. The communication interface also includes a device-specific logic in communication with said base media interface for decoding a message-specific semantic of an incoming vibration wave message and encoding a message-specific semantic of an outgoing vibration wave message, such that each of said plurality of devices may correspond in accordance with device-specific and message specific limitations.

24 Claims, 5 Drawing Sheets

VIBRATION-DRIVEN WIRELESS NETWORK

BACKGROUND OF THE INVENTION

1. Field of the Invention

The present invention relates in general to a loosely coupled network of electronic devices. In particular, the present invention relates to a method, system, and program for utilizing vibration waves as the coupling and driving mechanism for a network of localized devices.

2. Description of Related Art

As electronic devices become more pervasive in our everyday lives there is a corresponding need for these electronic devices to interact with each other. Such interaction requires the electronic devices to be connected in a network, such that information may be exchanged among them.

There are a variety of known methods for connecting electronic devices. For example, special dedicated wires could be installed within a household or an office to provide a communication medium among electronic devices such as personal computer (PC) systems, lights, alarms, etc. For existing electrical infrastructures, this is an expensive proposition. Dedicated wiring or optical cabling also presents added difficulty and expense when adding new devices to the network. It should be noted that utilizing existing wiring to "piggy-back" signals onto power supply lines presents similar system inflexibility problems as the dedicated lines.

An air interface signal medium provides greater flexibility and modularity than wire-based connectivity. A wireless network provides maximum modularity and flexibility for a loosely coupled intelligent network. Infrared or other "light" signals are not well suited for communication applications since they are limited to line-of-sight and would require a omni-directional transceivers.

Radio frequency (RF) signals are less easily blocked than light signals and have been successfully utilized for variety of wireless communication applications. In addition, RF-based communications systems are commonly utilized for providing a flexible transmission interface for a variety of communication devices such as AM and FM radios, wireless household telephones, cellular telephones, etc. A problem related to RF signaling is that of electromagnetic interference (EMI) that all electrical circuits inherently generate. Due to the pervasiveness of RF signaling, additional costly overhead is required to implement an RF-driven network for household or office use.

It would therefore be desirable to provide a wireless, low-cost communication interface for sharing information among multiple localized electronic devices.

SUMMARY OF THE INVENTION

A system, method, and program are disclosed for delivering messages among multiple localized electronic devices. A communication interface includes a base media interface within each of the networked devices for processing and propagating incoming and outgoing vibration wave messages in accordance with a network protocol. The communication interface also includes a device-specific logic in communication with the base media interface for decoding a message-specific semantic of an incoming vibration wave message and encoding a message-specific semantic of an outgoing vibration wave message, such that each of the devices may correspond in accordance with device-specific and message specific limitations.

DETAILED DESCRIPTION OF AN ILLUSTRATIVE EMBODIMENT

Figure 1:
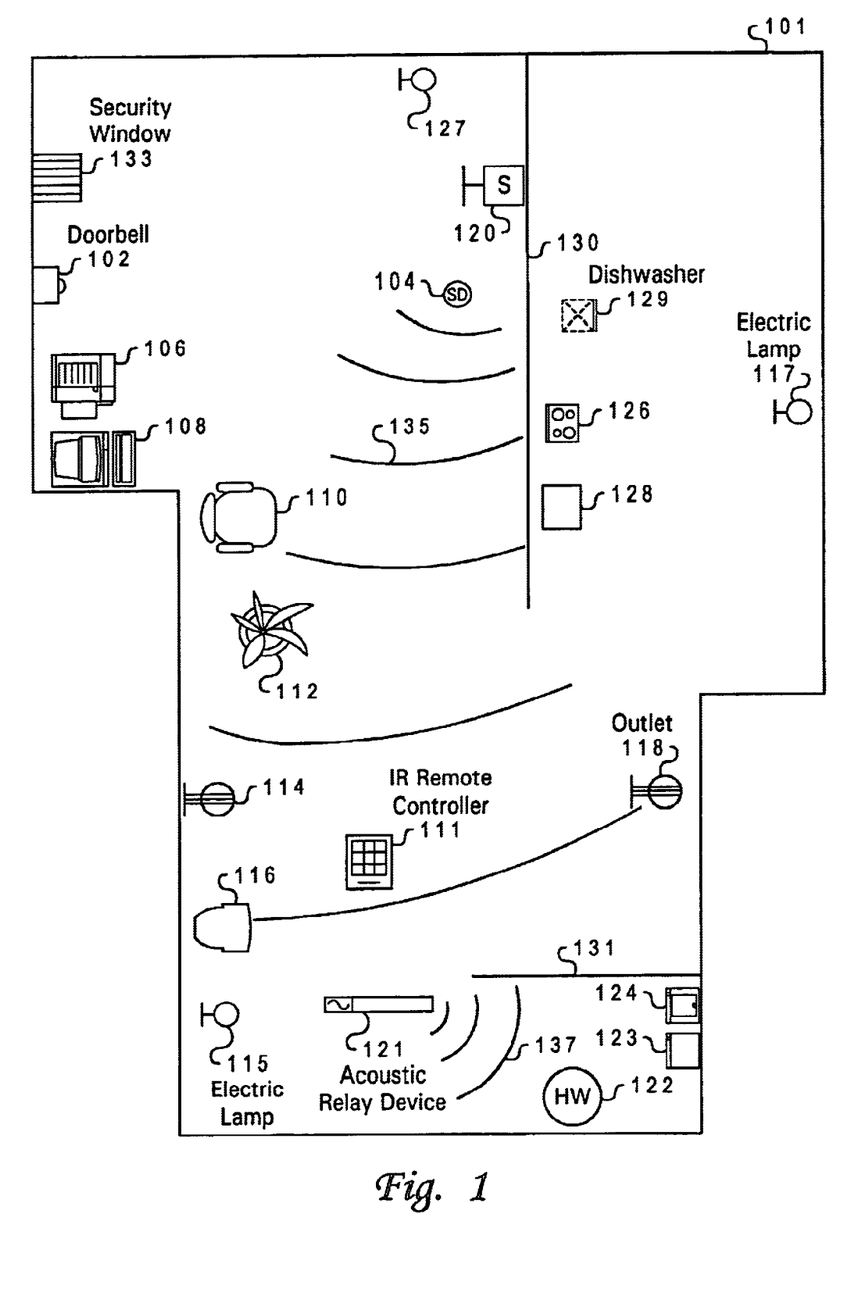
FIG. 1 is a simplified pictorial illustration of a localized set of electronic devices that are networked in accordance with a preferred embodiment of the present invention.

Referring now to the figures wherein like reference numerals refer to like and corresponding parts throughout, and in particular with reference to FIG. 1, there is depicted a set of electronic devices that are acoustically localized within the boundary of an exterior wall 101. As utilized herein, "electronic devices" refers to dynamically operating mechanisms or machines such as household or office appliances, or the like, that have operating characteristics which may be influenced by a microcontroller. Included among the electronic devices depicted in FIG. 1 are a security window 133, a door bell 102, a printer 106, a personal computer (PC) 108, a television 116, a battery-operated stereo 120, a water heater 122, a washing machine 124, a dryer 123, a dishwasher 129, a stove 126, a refrigerator 128, a smoke detector 104, an acoustic relay device 121, a pair of electrical outlets 114 and 118, and three electrical lamps 115, 117 and 127.

Along with the aforementioned devices, several non-electronic device structures are illustrated within exterior wall 101. Included among these structures are exterior wall 101 itself together with a chair 110, a plant 112, and an interior wall 130. The present invention provides a sound-driven communication interface among the devices shown in FIG. 1. Acoustic relay device 121 serves as a network component that is dedicated to propagating a given message that may otherwise fail to reach devices due to obstructions posed by the aforementioned non-device structures and sheer distance, or "holes" in the network interface due to a lack of enabled devices in close proximity.

There are many conceivable circumstances under which it would be advantageous for the electronic devices illustrated in FIG. 1 to be able to interactively communicate. FIGS. 2, 3, 4a, 4b, and 4c illustrate a system and method by which such intercommunication is provided utilizing vibration waves as the device-to-device communication medium. A preferred embodiment of the present invention utilizes air-borne audio frequency signals as the communication media among the devices depicted in FIG. 1. The low-frequency, air-propagated nature of this communication medium serves to alleviate line-of-sight limitations imposed by physical obstacles such as chair 110, plant 112, interior wall 130 and the corners of exterior wall 101. The airborne nature of this medium serves to make the network independent of household wiring for devices such as smoke detector 104 and battery-operated stereo 120.

Each of the devices within exterior wall 101 is equipped with a sound driven communication interface that is described in further detail with reference to FIGS. 2 and 3. The interface installed within each device includes a speaker for transmitting sound and a transducer for receiving airborne sound signals. Sound waves produced from the speakers travel through the air as longitudinal waves. Air molecules vibrate, changing the distance between each successive wave. Such longitudinal sound wave variation is often referred to as rarefractions and compressions.

Unlike light waves such as infared, sound waves are not line-of-sight limited. Therefore, the present invention permits refrigerator 128 to communicate with PC 108 despite the line-of-sight barrier imposed by interior wall 130. The permeability of sound throughout an acoustically localized enclosure such as exterior wall 101 is an advantage upon which the present invention capitalizes. As described in greater detail with reference to FIG. 2, each of the electronic devices within exterior wall 101 is equipped with a base media interface which provides a uniform sound transmission and protocol platform.

Figure 2:
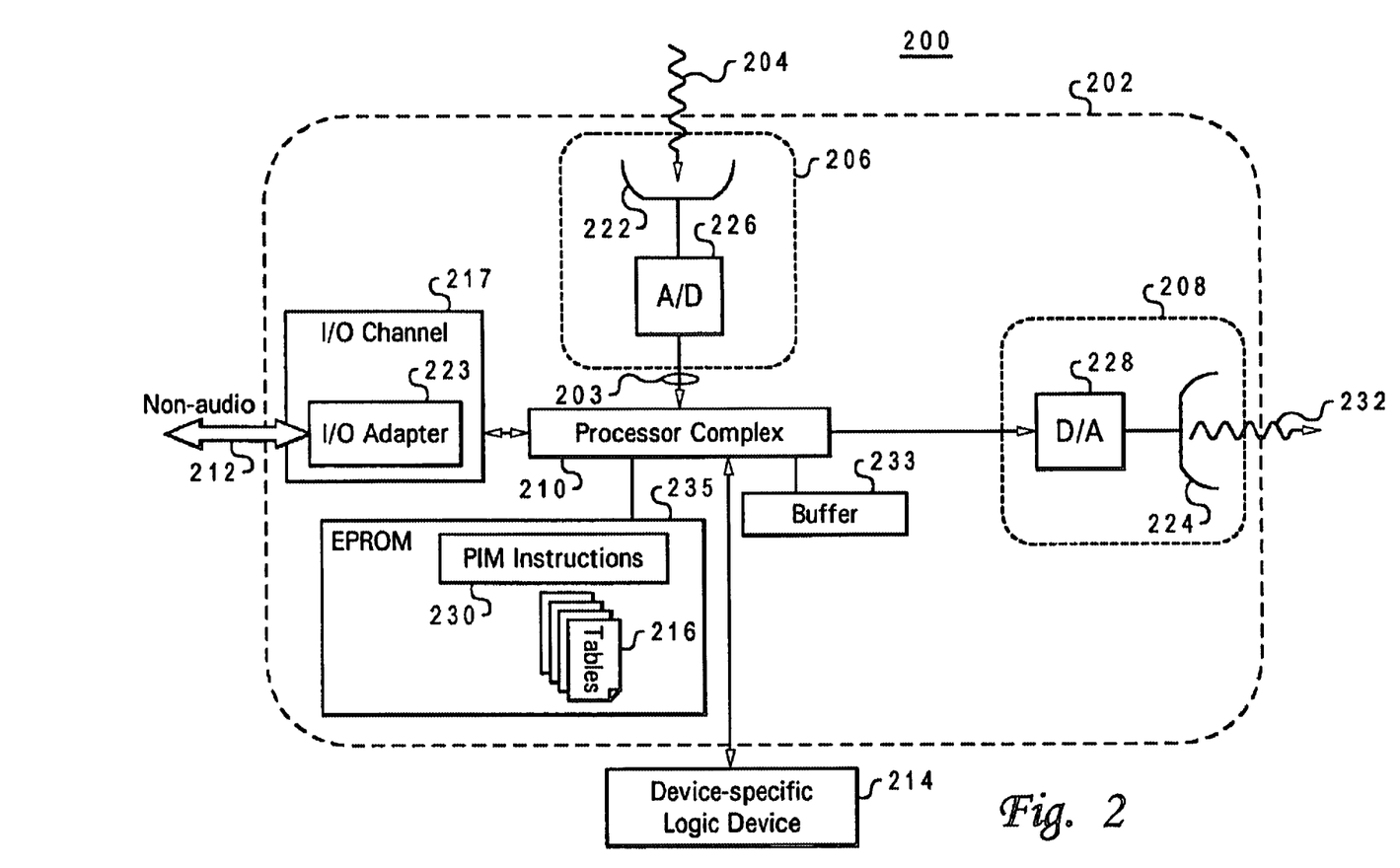
FIG. 2 is a block diagram illustrating an implementation of a base media interface and device-specific logic deivce implemented within the networked electronic devices depicted in FIG. 1.

Turning now to FIG. 2 there is depicted a block diagram illustrating a vibration-driven communication interface 200 as implemented within the networked devices depicted in FIG. 1, in accordance with a preferred embodiment of the present invention. As shown in FIG. 2, communication interface 200 includes a base media interface 202 and a device-specific logic module 214. According to a preferred embodiment of the present invention, base media interface 202 is installed as identical modules within each of the electronic devices within a vibration-driven network, such that a uniform communication platform is provided that is independent of device specific features or limitations.

As shown in FIG. 2, base media interface 202 includes a vibration wave transceiver comprising a vibration decoder 206 and a vibration encoder 208 which are both in communicative contact with a set of protocol interface macro instructions residing within a firmware module 230. In a preferred embodiment of the present invention, protocol interface macro 230 is installed within the base media interface of each network device, such that an identical set of protocol instructions are shared by all networked devices.

Vibration decoder 206 serves as the means by which the host device, in which communication interface 200 is installed, receives an incoming vibration message 204, which propagates through a non-electronic medium such as any solid, liquid, or gas. In the exemplary embodiment of FIG. 1, incoming vibration wave 204 is an airborne soundwave. A transducer 222 within vibration decoder 206 includes a diaphragm that vibrates in response to receiving incoming vibration message 204. In accordance with well-understood transducer operating principles, the vibration of a diaphragm(not depicted) within transducer 222 is converted into an analog electrical signal which is digitized within an analog-to-digital (A/D) converter 226. It should be noted that, consistent with the spirit and scope of the present invention, transducer 222 can be replaced by a more generalized transducer device capable of converting a mechanically-propagated message (such as ultrasonic or sub-sonic signals transmitted through any non-electronic medium including air, water, solid fixtures, etc.).

In accordance with an important feature of the present invention, digitized, vibration-encoded signals are transported through signal interface 203 from vibration decoder 206 to computer processing means within a processor complex 210. In response to receiving signal 203, processor complex 210 reads the protocol interface macro instructions within firmware module 230 within an electronically programmable read-only memory (EPROM) 235. Processor complex 210 is a silicon-fabricated device capable of interpreting and executing instructions similar to central processing units that are well known in the art.

The firmware instructions within protocol interface macro 230 include instructions for decoding incoming vibration message 204 in accordance with a pre-defined network protocol. As explained in further detail with reference to FIGS. 4a and 4b, the network protocol of the present invention includes both a network message identifier and a "pass-it-along" algorithm for ensuring adequate message propagation. In the interest of uniformity and resulting network flexibility and modularity, the network protocol establishes a set of rules designed to enable networked devices to identify one another and exchange information with maximum efficiency. This protocol includes a syntax which allows an incoming sound-encoded digital signal to be promptly identified as a network message. The "pass-it-along" algorithm ensures comprehensive propagation of messages throughout the network by requiring each device to automatically relay first-time-received messages. This method thus prevents redundant, unnecessary, or repetitive message transmissions.

Upon receipt of incoming vibration wave 204, the rules established by the network protocol require the reading of either a device-specific or message-specific flag. The device-specific or message-specific flag is read by processor complex 210 in accordance with protocol interface macro 230 and provide a means by which the host device determines whether an incoming message has been previously received, and if so, to avoid repetitive retransmission of the message.

If a message-specific flag is utilized, a buffer 233 is utilized to store message-specific identifiers for each newly received message. This collection of message-specific identifiers within buffer 233 can be compared with the content of incoming vibration message 204 to determine if incoming vibration message 204 has previously been received by the host device. If a device-specific flag is utilized, the host device encodes a flag within outgoing vibration message 232 identifying itself as a recipient of the message. Either the message-specific or device specific flag can be set utilizing one of two possible control signal techniques. A vibration-encoded header or trailer "control" segment may be included within each of the vibration-encoded messages 204 and 232. Alternatively, a control signal overlay technique may be utilized. The overlay technique may be performed by utilizing vibration encoder 208 to superimpose a control vibration onto vibration messages 204 and 232 such that filtering devices within vibration decoder 206 may provide separate control and message semantic signals to processor complex 210. Whichever control signal technique is employed is also utilized to carry network message identification information.

As further depicted in FIG. 2, communication interface 200 includes a device-specific logic module 214 that decodes a message-specific semantic of signal 203, such that the host device may respond in accordance with message specific limitations. Device-specific logic module 214 includes a set of device-specific instructions which are accessed during message decoding and encoding. As explained in greater detail with reference to FIG. 3, the device-specific instructions permit processing complex 210 to deliver commands via a non-vibration I/O channel 217 and digital representations of vibration-encoded signals to a vibration encoder 208 in accordance with both message-specific and device-specific limitations.

Vibration encoder 208 provides a uniform transmission platform within each of the networked devices by which an outgoing vibration message 232 is generated and transmitted. As further illustrated in FIG. 2, vibration encoder 208 is in communicative contact with protocol interface macro 230 as well as a pre-stored vibration signal table 216 via processor complex 210. Vibration encoder 208 includes a digital-to-analog (D/A) converter 228 for converting a vibration-encoded digital signal from processor complex 210 to an analog signal. An output transducer 224 translates the converted signal into an airborne outgoing vibration message 232. Similar in construction and operating principles as input transducer 222, output transducer 224 may be replaced by any form of transducer capable of converting an electric signal into a mechanical motion by which a message may be outwardly conveyed.

Vibration signal table 216 is an important feature within base media interface 202. Multiple vibration wave signals are stored and indexed in a digitized format within vibration signal table 216 and accessed by processor complex 210 to formulate an outgoing vibration message such as outgoing vibration message 232. In the case in which outgoing vibration message 232 is generated in response to incoming vibration message 204, processor complex 210 assembles message-specific and device-specific encoding requirements as determined by device-specific logic 214. Such encoding is performed in response to the decoding of incoming vibration message 204 as described above.

For some networked devices such as television 116, PC 108 and stereo 120, additional device-specific information may be relevant in determining the semantics of an outgoing message. As depicted in FIG. 2, a non-vibration input signal 212 provides additional information to computer processor complex 210 within base media interface 202. Within I/O channel 217 is an I/O adapter 223 which serves to physically connect the control electronics of one or more devices with base media interface 202. I/O channel 217 thus provides an interface by which commands from device-specific logic 214 may be performed with respect to operational control of the host device itself. Processor complex 210 provides processing required to respond to non-vibration input into I/O adapter 223.

As an example, an infared signal from remote controller 111 serves as a non-vibration input signal 212 which is received as a digital control command to I/O adapter 223. Processor complex 210 responds by reading device-specific instructions within device-specific logic 214. The device-specific instructions are designed to provide appropriate response by the host device to both network messages and other control inputs, such as the IR signal. In accordance with the device-specific instructions, processor complex 210 responds with commands to either (or both) the vibration encoder or I/O channel 217.

Figure 3:
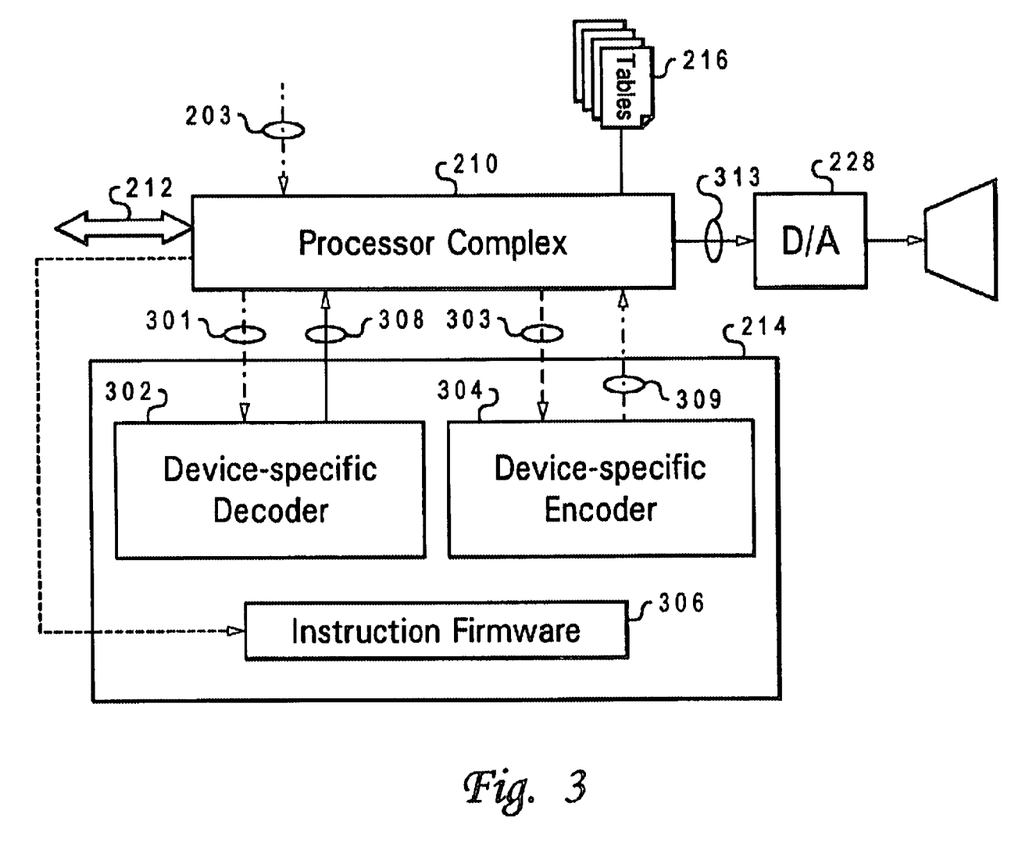
FIG. 3 is a block diagram depicting implementation of a device-specific logic in accordance with the embodiment depicted in FIG. 2.

Turning now to FIG. 3, there is illustrated a block diagram depicting implementation of device-specific logic 214 in accordance with the embodiment depicted in FIG. 2.

As shown in FIG. 3, signal 203 is received by processor complex 210 and network message identification is verified by comparing control message information encoded within signal 203 in accordance with protocol syntax as defined by protocol interface macro 230. After verification, the message is delivered as a semantic-encoded signal 301 to a device-specific decoder 302 within device-specific logic 214.

In an important feature of the present invention, device-specific decoder 302 decodes the message semantic of signal 301 in accordance with the relevance of the semantic on the particular host device. In this manner device-specific requirements and limitations can be adaptively formulated within device-specific logic 214 without altering the uniformity of the processing intelligence within base media interface 202. Network flexibility and modularity are thus enhanced.

Device-specific decoder 302 decodes the non-control semantic (substantive message) of signal 301 and returns it as decoded signal 308 which, due to device-specific instructions 306 within device-specific decoder 302, is more than a mere electronic translation of the semantic of the original input vibration wave 204. Signal 308 is thus a translation of the semantics of signal 301 as relevant with respect to the host device. Processor complex 210 which responds to receipt of decoded signal 308 by reading device-specific instructions within an instruction firmware module 306 which is a non-volatile memory device similar to EPROM 235.

If the device-specific instructions 306 require a non-message response from the host device, processor complex 210 will issue commands to a host device controller (not depicted) through non-vibration interface 212. If the device-specific instructions 306 require that an vibration message be transmitted from the host device, processor complex 210 issues an unencoded message 303 to a device-specific encoder 304. Unencoded message 303 is generated by processor complex 210 according, to device-specific instruction 306, and therefore incorporates both message semantics and device-specific requirements and limitations.

As further depicted in FIG. 3, device-specific encoder 304 returns a signal 309 that is encoded with a semantic in accordance with the instruction 306. Processor complex 210 responds to receipt of encoded signal 309 adding a control message in accordance with one of the techniques described with reference to FIG. 2. The general control message technique (header/trailer or overlay) and specifics are is commonly shared by all networked devices by instructions within protocol interface macro 230. A resultant outgoing message is delivered as digitized vibration signal 313 to D/A converter 228 for conversion and transmission. In accordance with a preferred embodiment of the present invention, processor complex 210 accesses and incorporates digitized vibration signals from within vibration signal table 216 for both message semantics and control signal encoding for digitized vibration signal 313.

Figure 4A:
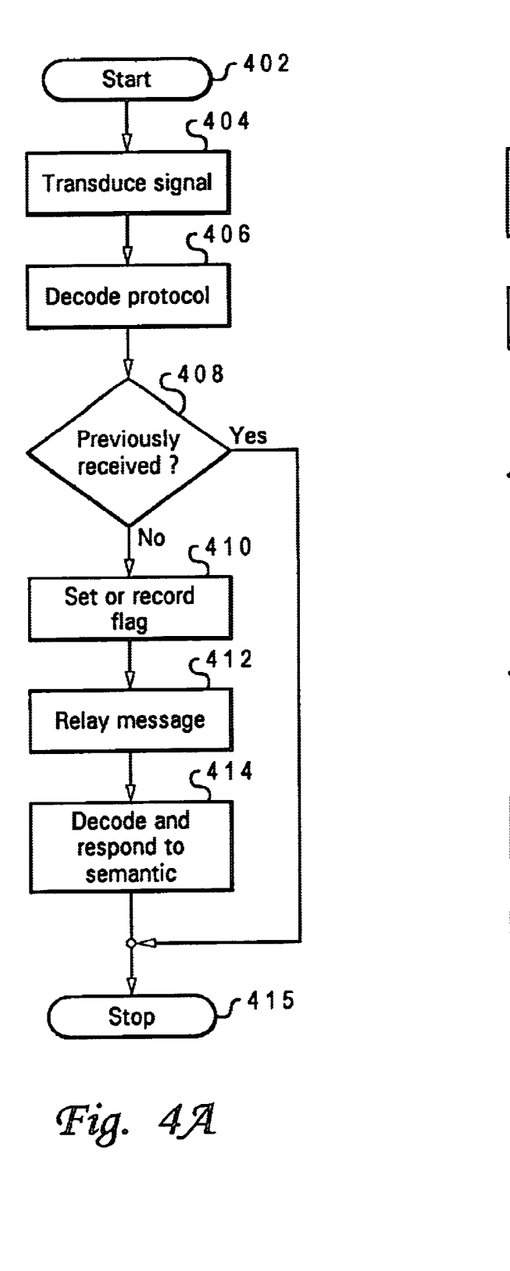
FIG. 4a is a high-level flow diagram illustrating steps performed by the base media interface and device-specific logic in performing the pass-it-along algorithm in accordance with a preferred embodiment of the present invention.
Figure 4B:
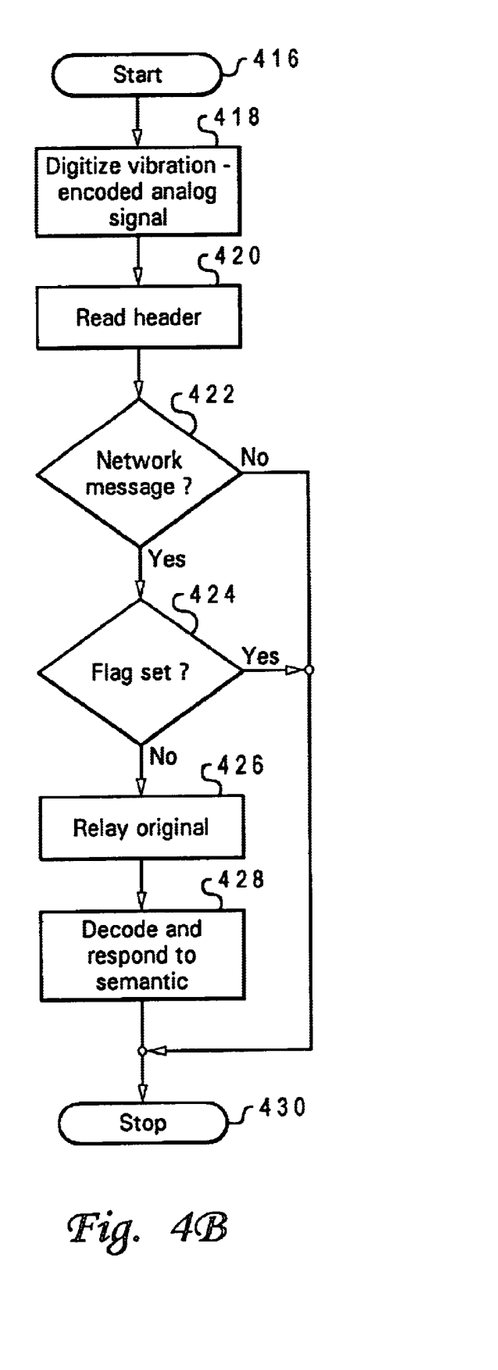
FIG. 4b is a high-level flow diagram depicting steps performed by the base media interface and device-specific logic in performing protocol processing in accordance with a preferred embodiment of the present invention.
Figure 4C:
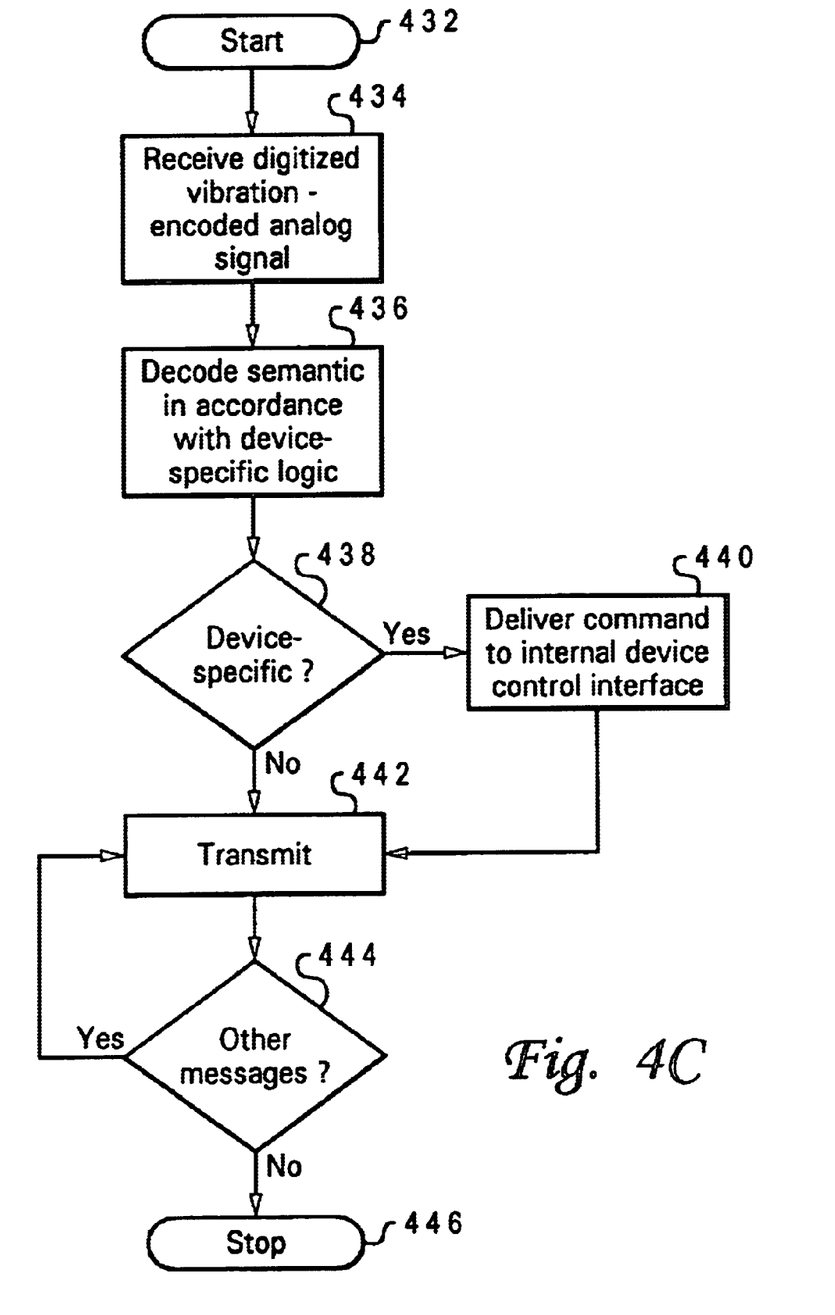
FIG. 4c is a high-level flow diagram depicting steps performed by the base media interface and device-specific logic in performing message processing in accordance with a preferred embodiment of the present invention.

With reference now to FIGS. 4a, 4b, and 4c there is illustrated a method performed by communication interface 200 for receiving, processing, and delivering vibration wave messages in accordance with a preferred embodiment of the present invention. Beginning with FIG. 4a, there is shown a high-level flow diagram illustrating steps 402 through 414 performed by base media interface 202 and device-specific logic 214 in performing the aforementioned pass-it-along algorithm.

As illustrated at steps 402 and 404, the process is initiated by receipt and electrical translation of incoming vibration wave 204. Next, step 406 depicts verification that incoming vibration wave 204 is delivering a network message as identified by the protocol interface macro instructions within firmware module 230. The protocol interface macro instructions within firmware module 230 in conjunction with computer processor complex 210 are utilized in performing step 406.

Proceeding to inquiry step 408, the first step in the aforementioned "pass-it-along" algorithm is illustrated. As shown at steps 408 and 414, if the decoded message, as determined by the protocol interface macro, has been previously received at base media interface 202, the message terminates to avoid repetitive message propagation. In accordance with alternate embodiments of the present invention, the inquiry depicted at step 408 is performed within base media interface 202 in accordance with one of two possible message flagging methods that are jointly depicted at step 410.

The first method entails attaching a device-specific flag to each processed message, such that as part of protocol processing, processor complex 210 will execute protocol interface macro instructions to examine the control portion of the message (header/trailer or overlayed). The examination of the control message includes reading the control message in search of a device-specific flag to determine whether the host device has previously received and processed this message. Thus, if the "device-specific" flag method is employed at step 410, the inquiry performed at step 408 includes reading the control message to determine whether the device-specific flag has been set. If so, the message is terminated. Otherwise the process continues as depicted at step 412.

In an alternate to the device-specific flag setting embodiment, buffer 233 is utilized to store a message-specific identification flag for recently received messages. This message-specific flag will be initially set within the control portion of the message by the communication interface within the electronic device from which the message originates. The message-specific identifier flag is stored as a series of coded bits within buffer 233, such that the determination depicted at step 408 may be performed on by comparing control message information of an incoming message with the flags stored within buffer 233. If, as determined by one of the two techniques performed at step 408, the host device has not previously received the message, then, as illustrated at step 410, either the device-specific identifier flag is encoded into the control portion of the message, or the message-specific identifier flag is written into buffer 233.

Proceeding to step 412, the original message is automatically transmitted and thus "passed-along" within the vibration-driven network. The process continues as shown at step 414 with a determination of whether the message includes "device specific" instructions by which the message conveys instructions for initiating or modifying at least one behavioral aspect of the host device. As explained with reference to FIG. 3, step 414 is performed in accordance with the semantic of the message as translated by processing means 210 in conjunction with device-specific logic 214.

Proceeding to FIG. 4b there is illustrated a flow diagram depicting a more detailed sequence of steps performed by base media interface 202 and device-specific logic 214 in performing protocol processing in accordance with a preferred embodiment of the present invention. As shown as steps 416 and 418, the protocol processing begins with the A/D conversion of the transduced incoming signal. Next, as illustrated at step 420 the control message header is read by processing complex 210 in accordance with protocol interface macro instructions. All network messages will be encoded to include a network message identifier in accordance with the protocol interface macro instructions of the originating device. Steps 418 and 420 provide a more detailed illustration of step 406 of FIG. 4a.

Continuing to step 422, if the control header (or overlayed control signal) reveals that the incoming signal is not a network message, then the process terminates as shown at step 430. If the signal is identified as a network message, the process continues as depicted at steps 424, 426, and 428 in a similar manner to that shown at steps 408, 412, and 414, in which the pass-it-along algorithm commences.

FIG. 4c is a high-level flow diagram depicting steps performed by base media interface 202 and device-specific logic 214 in performing message processing in accordance with a preferred embodiment of the present invention. Step 432 illustrates the commencing of message semantic processing as generally depicted at steps 414 and 426 of FIGS. 4a and 4b, respectively. Proceeding to step 434, digitized signal 203 is received by processor complex 210. Next, as shown at step 436 the message semantic is decoded within device-specific decoder 302 to produce a translation (signal 308) that is both device-specific and message-specific. Steps 438 and 440 processor complex 210 delivers a command responsive to a device-specific instruction within the original message to interface 212.

Referring back to FIG. 1 as an example of implementation of the steps shown in FIGS. 4a, 4b, and 4c, a sound alarm 130 from smoke detector 104 is potentially beneficial if received and processed by household powered devices such as water heater 122 and stove 126. In contrast, the benefit derived by reception of sound alarm 130 by portable stereo 120 may be minimal or non-existent. However, due to the proximity of acoustic relay device 121, with respect to refrigerator 128, stove 126, washer 124, and water heater 122, it may relay the sound alarm as audio frequency signal 132 to the other devices.

Continuing with the smoke alarm example, the device-specific logic within stove 126 reads the message semantic from acoustic relay device 121, and as depicted at step 418, will alter its operation (deactivate in accordance with a signal from I/O channel 217 delivered to a power control switch within stove 126, for example) in accordance with the semantics of the message as determined by device-specific logic 214. Additionally, the base media interface within stove 126 will deliver an vibration wave message (step 420) that has been encoded within device-specific logic 214 as described with reference to FIG. 3. In accordance with an inquiry depicted at step 444 of FIG. 4c vibration encoder 208 may be required to transmit one or more messages in addition to or in place of the original received message.

Alternative scenarios in which sequence 400 may be advantageously utilized within the vibration-driven network depicted in FIG. 1 include but are not limited to the following examples. A standard set of messages encoded as vibration signals stored and indexed within vibration signal table 216. Such standard messages may be utilized for fire, security alarm, overall device status, reset, initialize, etc. Devices equipped with vibration-driven communication interface 200 may include pre-programmed instructions for default operation. For example, lamp 115 may include default instructions for switching "ON" in response to receiving audio signal 130. For a psuedo-code representation of the method depicted in FIGS. 4a, 4b, and 4c refer to the attached Appendix A. In another example, door bell 102 is the host device receiving non-audio input in the form of a door bell ring via I/O channel 217. In response to receiving the door bell ring, steps 402 through 412 of FIG. 4A are unnecessary since the message is a non-network input. However, device-specific instructions within instruction firmware 306, may require that the base media interface 202 residing within doorbell deliver a vibration-encoded network message (steps 414 of FIG. 4a, 428 of FIG. 4B, and 438 though 444 of FIG. 4c). For example, a single door bell ring received by processor complex 210 though I/O channel 217 may be interpreted in accordance with device-specific logic module 214 to be a special "stranger-at-the-door" alert which precipitates the need for a network message response from base media interface 202 within host door bell 102. Host devices receiving the "stranger-at-the-door network message transmitted from vibration encoder 208 within base media interface of doorbell 102 may include television 116 and electric lamp 105.

The base media interface 202 within the host television 116 would first identify the message as a network message (step 406 of FIG. 4A and steps 420 and 422 of FIG. 4B). Next, the pass-it-along algorithm as illustrated by steps 408, 410, and 412 of FIG. 4A and steps 424 and 426 of FIG. 4B would commence within base media interface 202. In this manner, the vibration-encoded network message that was originally transmitted from doorbell 102 will reach more remote host devices such as electric lamp 117. It should be noted that in accordance with the message termination feature of the pass-it-along algorithm, the message will, not be repetitively relayed by television 116 or electrical lamp 115 after the initial processing (steps 404, 406, 408, and 415 of FIG. 4a and steps 418, 420, 422, 424, and 430 of FIG. 4b).

After verifying that the network message from doorbell 102 has not been previously processed, the message semantic is decoded in accordance with device-specific decoder 302. With television 116 as the host, the logic (possibly including firmware instructions) within device-specific decoder 302 will decode a message semantic in accordance with its relevance with respect to host device television 116. For example, decoding logic may be configured or programmed to interpret the single-ring "stranger" door bell message from door bell 102 as being relevant to a control action by host television 116 and send a corresponding alert message 308 to processor complex 210. Processor responds to the alert by reading instructions within instruction firmware 306 to locate and retrieve the appropriate response to the "stranger-at-the-door" alert 308. The instruction corresponding to this alert may be a command from processor complex 210 to the volume control of television 116 to lower or raise the volume. Electric lamp 115 would process and respond to the "stranger-at-the-door" message similarly to television 116 at the network protocol level (steps 404, 406, 410, and 412 of FIG. 4a and steps 418, 420, 422, 424, and 426 of FIG. 4b).

The response of electrical lamp 115 to the device-specific processing illustrated at steps will be different. The device-specific decoder 302 within the host electric lamp 115 may include instructions to disregard the "stranger-at-the-door" message. Alternatively, the device-specific decoder 302 may deliver an alert message to processor complex 210 which responds by retrieves the appropriate instruction from instruction firmware 306. For example, instruction firmware may be pre-programmed to deliver a "blink light" command to processor complex 210 which responds via I/O channel 217 to implement the instruction.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. In a communication interface communicatively coupled to a host apparatus, a method for conducting network communications, said method comprising:
   transducing a received sound-encoded signal into an electronically-encoded signal;
   processing the transduced signal in accordance with a network distribution protocol;
   decoding a message semantic of the transduced signal, said decoding comprising translating the message semantic in accordance with operating characteristics native to said host apparatus; and
   transmitting an outgoing sound-encoded signal from said host apparatus in accordance with said network distribution protocol processing.

2. The method of claim 1, wherein said transmitting an outgoing sound-encoded signal is preceded by encoding said outgoing sound-encoded signal in accordance with said translated message semantic.

3. The method of claim 1, wherein said transducing a received sound-encoded signal further comprises translating said sound-encoded signal into a digitized electronic signal.

4. The method of claim 2, wherein said method said processing the transduced signal in accordance with a network distribution protocol comprises:
   reading the electronically-encoded signal to verify a network message identifier encoded within said electronically-encoded signal;
   terminating the electronically-encoded signal in response to failing to verify said network message identifier; and
   commencing said message semantic decoding of said electronically-encoded signal in response to verifying said network message identifier.

5. The method of claim 1, wherein said processing the transduced signal in accordance with a network distribution protocol comprises determining whether or not a message carried by the transduced signal has been previously received by said communication interface.

6. The method of claim 1, further comprising processing the translated message semantic, and in response thereto accessing a host-specific instruction stored within said communication interface.

7. The method of claim 6, further comprising encoding a network message to be transmitted from said communication interface in accordance with said host-specific instruction.

8. The method of claim 7, further comprising:
   translating a digital signal carrying said encoded network message into an analog network message signal; and
   converting said analog network message signal into an outgoing sound-encoded signal.

9. The method of claim 6, said accessing a host-specific instruction comprising accessing said host-specific instruction from a host-specific logic module stored within said communication interface.

10. The method of claim 6, further comprising issuing to said host apparatus a command in accordance with said host-specific instruction.

11. A communication interface communicatively coupled to a host apparatus, said communication interface comprising:
- a transceiver having a processor for processing incoming and outgoing sound-encoded messages in accordance with a network protocol, said transceiver including an input transducer that transduces a received sound-encoded signal into an electronically-encoded signal;
- a protocol interface macro communicatively coupled to said transceiver processor for processing the transduced signal in accordance with a network distribution protocol;
- a device-specific logic in communication with said transceiver for decoding a message semantic of said transduced signal, said decoding comprising translating the message semantic in accordance with operating characteristics native to said host apparatus; and
- wherein said transceiver further includes an output transducer that transmits an outgoing sound-encoded signal from said host apparatus in accordance with said network distribution protocol processing.

12. The communication interface of claim 11, wherein said device-specific logic comprises encoder logic for encoding the outgoing sound-encoded signal in accordance with said translated message semantic.

13. The communication interface of claim 11, said input transducer converting the received sound-encoded signal into an analog electronic signal, and wherein said transceiver further comprises an analog-to-digital converter for digitizing said analog electronic signal.

14. The communication interface of claim 12, wherein said transceiver further comprises a vibration encoder in communication with said device-specific logic for generating and transmitting an outgoing sound-encoded signal carrying said translated message semantic.

15. The communication interface of claim 14, wherein said vibration encoder comprises:
- a digital-to-analog converter for converting a digital signal from a processor complex into an analog signal; and
- an output transducer that converts said analog signal into an outgoing sound-encoded signal.

16. The communication interface of claim 14, wherein said transceiver further includes a message table which stores a plurality of sound-encoded signals in digital format.

17. The communication interface of claim 16, wherein said device-specific logic encodes said outgoing sound-encoded signal utilizing at least one of said plurality of sound-encoded signals within said message table.

18. The communication interface of claim 16, wherein said transceiver further comprises a processor complex that provides interactive processing among said protocol interface macro, said message table, and said device-specific logic.

19. The communication interface of claim 18, further comprising a feedback source in communication with said processor complex for providing external non-vibration feedback control of said outgoing sound-encoded signal.

20. The communication interface of claim 11, further comprising a processor complex that processes said electronically-encoded signal in accordance with a network distribution protocol, said processing comprising determining whether or not a message carried by said electronically-encoded signal has been previously received by said communication interface.

21. The communication interface of claim 11, further comprising a processor complex that processes the translated message semantic, and in response thereto, accesses a host-specific instruction stored within said communication interface.

22. The communication interface of claim 21, wherein said processor complex accesses said host-specific instruction from a device-specific logic module stored within said communication interface.

23. The communication interface of claim 21, wherein said processor complex issues to said host apparatus a command in accordance with said host-specific instruction.

24. A method, within a communication interface communicatively coupled to a host-apparatus, for processing a message received from another device, said method comprising:
- transducing a received sound-encoded signal into an electronically-encoded signal;
- processing said electronically-encoded signal in accordance with a network distribution protocol, said processing including:
  - responsive to determining that said received signal is a network message, determining whether or not a network message carried by said received signal has been previously received by said communication interface;
  - responsive to determining that said network message has been previously received by said communication interface, discarding said network message; and
  - responsive to determining that said network message has not been previously received by said communication interface, decoding a message semantic of said electronically-encoded signal, said decoding comprising translating the message semantic in accordance with operating characteristics native to said host apparatus; and
- transmitting an outgoing sound-encoded signal from said host apparatus in accordance with said network distribution protocol processing.

* * * * *

UNITED STATES PATENT AND TRADEMARK OFFICE
CERTIFICATE OF CORRECTION

PATENT NO. : 6,907,021 B1
DATED : June 14, 2005
INVENTOR(S) : Christopher John Nelson It is certified that error appears in the above-identified patent and that said Letters Patent is hereby corrected as shown below:

<u>Column 10,</u>
Line 31, delete "said method said" and insert -- said --.

Signed and Sealed this

Sixteenth Day of May, 2006

JON W. DUDAS
*Director of the United States Patent and Trademark Office*